(12) United States Patent
Inskeep

(10) Patent No.: US 9,515,419 B2
(45) Date of Patent: Dec. 6, 2016

(54) HIGH POWER RECHARGEABLE FLASHLIGHT WITH TWO WAY UNIVERSAL SERIAL BUS

(71) Applicant: Mathew Inskeep, Highland Beach, FL (US)

(72) Inventor: Mathew Inskeep, Highland Beach, FL (US)

( * ) Notice: Subject to any disclaimer, the term of this patent is extended or adjusted under 35 U.S.C. 154(b) by 120 days.

(21) Appl. No.: 14/321,895

(22) Filed: Jul. 2, 2014

(65) Prior Publication Data

US 2016/0006179 A1 Jan. 7, 2016
US 2016/0211616 A9 Jul. 21, 2016

Related U.S. Application Data

(60) Provisional application No. 61/865,811, filed on Aug. 14, 2013.

(51) Int. Cl.
| | |
|---|---|
| *H01R 27/00* | (2006.01) |
| *H01R 13/642* | (2006.01) |
| *H05B 33/08* | (2006.01) |
| *H02J 7/00* | (2006.01) |
| *F21L 4/08* | (2006.01) |
| *F21Y 101/00* | (2016.01) |

(52) U.S. Cl.
CPC .............. *H01R 13/642* (2013.01); *F21L 4/08* (2013.01); *F21L 4/085* (2013.01); *H02J 7/0054* (2013.01); *H05B 33/0803* (2013.01); *H05B 33/0815* (2013.01); *F21Y 2101/00* (2013.01); *H02J 2007/0062* (2013.01)

(58) Field of Classification Search
CPC ... H01R 13/642; H01R 25/006; G06F 1/1626; G06F 9/4413; F21L 4/08
USPC ........................................................ 439/217
See application file for complete search history.

(56) References Cited

U.S. PATENT DOCUMENTS

| | | | | |
|---|---|---|---|---|
| 7,093,153 B1* | 8/2006 | Witek | ........................ | G06F 1/08 327/100 |
| 7,525,291 B1* | 4/2009 | Ferguson | .............. | H02J 7/0021 320/128 |
| 8,819,301 B2* | 8/2014 | Lai | ......................... | H02J 7/0004 710/10 |
| 2002/0038394 A1* | 3/2002 | Liang | ....................... | G06F 1/266 710/62 |
| 2007/0103115 A1* | 5/2007 | Liu | .......................... | G06F 1/266 320/114 |
| 2008/0238205 A1* | 10/2008 | Lee | ........................... | H02J 9/061 307/66 |
| 2009/0013111 A1* | 1/2009 | Berland | .............. | G06F 13/4027 710/106 |
| 2009/0156055 A1* | 6/2009 | Park | ..................... | H01R 25/006 439/544 |
| 2009/0198839 A1* | 8/2009 | Banerjee | ............... | G06F 9/4413 710/10 |

(Continued)

*Primary Examiner* — Jean F Duverne

(57) ABSTRACT

A bidirectional universal serial bus (USB) adapter port that can be integrated into a rechargeable battery operated flashlight or other rechargeable battery operated device. The invention utilizes a micro-controller to convert a single USB adapter port into either an input device or an output device. A high power rechargeable flashlight with bidirectional USB adapter port is capable of recharging external electronic devices, as well as recharging itself through the same port.

18 Claims, 3 Drawing Sheets

(56) References Cited

U.S. PATENT DOCUMENTS

| | | | |
|---|---|---|---|
| 2010/0093401 A1* | 4/2010 | Moran | G06F 1/1626 455/566 |
| 2011/0087805 A1* | 4/2011 | Liu | G06F 13/4081 710/14 |
| 2012/0289291 A1* | 11/2012 | Moran | H04M 1/0256 455/566 |
| 2014/0014125 A1* | 1/2014 | Fernando | A24F 47/008 131/328 |
| 2015/0003050 A1* | 1/2015 | Parsons | F21L 4/005 362/158 |

* cited by examiner

HIGH POWER RECHARGEABLE FLASHLIGHT WITH TWO WAY UNIVERSAL SERIAL BUS

This application claims the benefit and priority of U.S. Ser. No. 61/865,811

STATEMENT REGARDING FEDERALLY SPONSORED RESEARCH

The invention was not made under government contract nor was funded grant money used to fund the research

FIELD

Rechargeable Flashlights and Portable Power

BACKGROUND

The present invention is a handheld flashlight with integrated portable power capabilities via two-way universal serial bus (USB). Flashlights are useful portable devices that provide light to users in the event of power outages, nighttime outdoor activities and many other circumstances. This invention combines the utility of a flashlight and a backup power source for recharging various electronic devices.

SUMMARY

The invention is a high power recharegable flashlight with two way universal serial bus (USB) This handheld flashlight with integrated portable power capabilities via two way universal serial bus provides the utility of a traditional flashlight with the benefit of on the go backup power. Flashlights are useful portable light sources and are common to almost every home. With our increased reliance on smart phones, tablet style computers and related portable devices, back up power is essential when away from a primary charging source such as a home outlet or automobile. The present invention with its universal serial bus with the assistance of an adapter is capable of powering and transferring energy to small rechargeable electronic devices. Additionally, the invention uses the same universal serial bus to draw energy from an external adapter to recharge its own internal battery. The invention utilizes USB adapters and modifies their electrical characteristics to allow the adapter to serve the two purposes of both powering and transferring energy to small electronics or recharging itself through the same port. Currently, other market available designs required dual adapters to accomplish this function. The user can take advantage of the present invention by having a built-in USB adapter port that can recharge and power their small portable devices as well as acting as a rechargeable light source, namely a flashlight.

DRAWINGS

DETAILED DESCRIPTION

Figure 1:
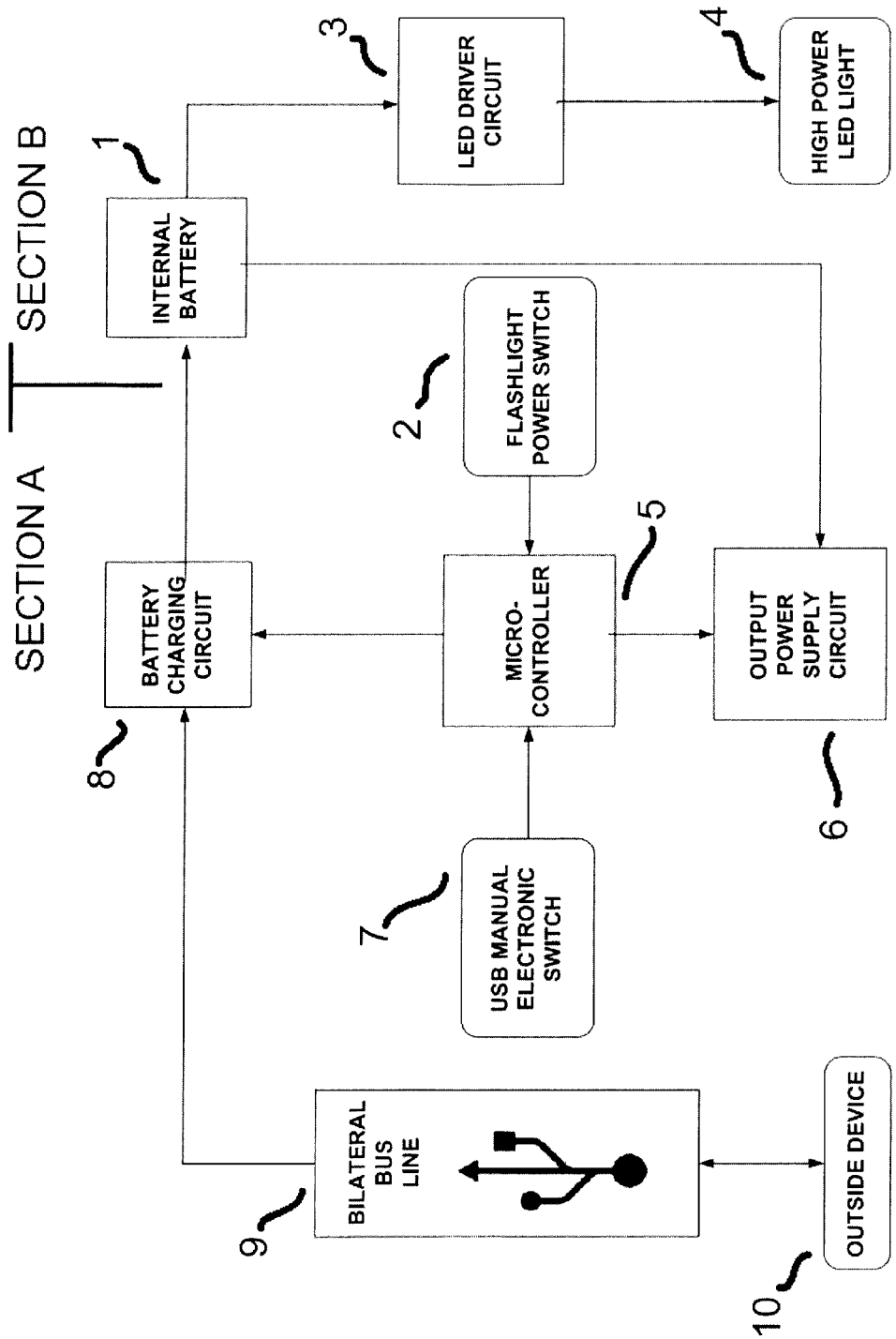
FIG. 1 is a block diagram of the internal functions of the universal serial bus (USB) control circuit including the function of the rechargeable high power LED flashlight.
Figure 2:
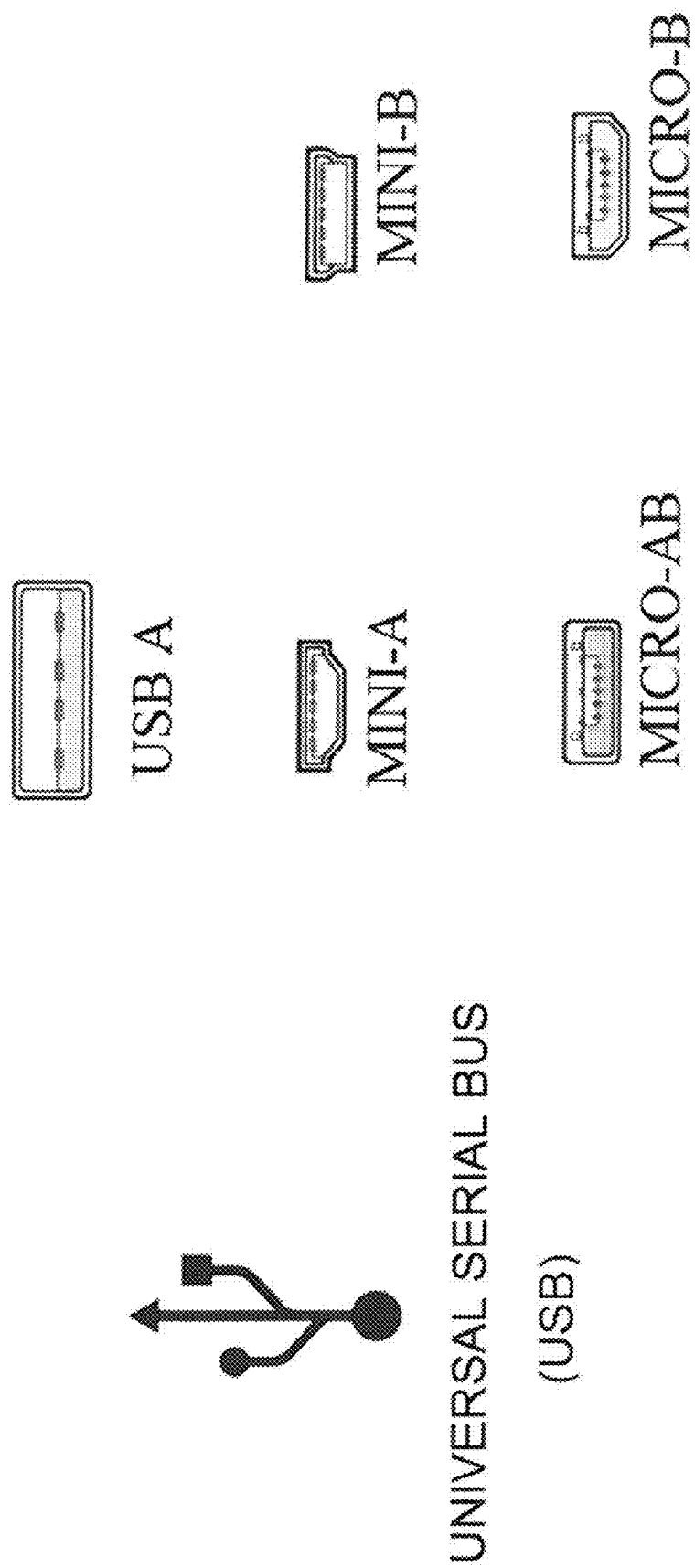
FIG. 2 is a physical appearance of various universal serial ports available that can be used in combination with the flashlight.

FIG. 1 shows an internal diagram of the present invention and all its major electrical components. The circuitry is divided into section A and section B. Section A describes the major components and internal circuits of the bidirectional universal serial bus (USB) 9 circuit operation. Section B shows the internal circuit operation of the high power rechargeable flashlight. The combination of both circuits are essential to the invention. The USB adapter port 9 can be optimized for different situations. For example the charging port's physical size and power carrying capabilities, to allow high efficiency power across various situations and need not be limited to only one type of adapter. It may take other form as shown in FIG. 2; USB A, Mini A, Micro AB. Also, this particular adapter port's 9 main characteristic is to be mechanically and electrically coupled with any external device with similar connectivity 10. The external device 10 can be directly coupled to the USB adapter port 9 or through an adapter USB extension cord.

Figure 3:
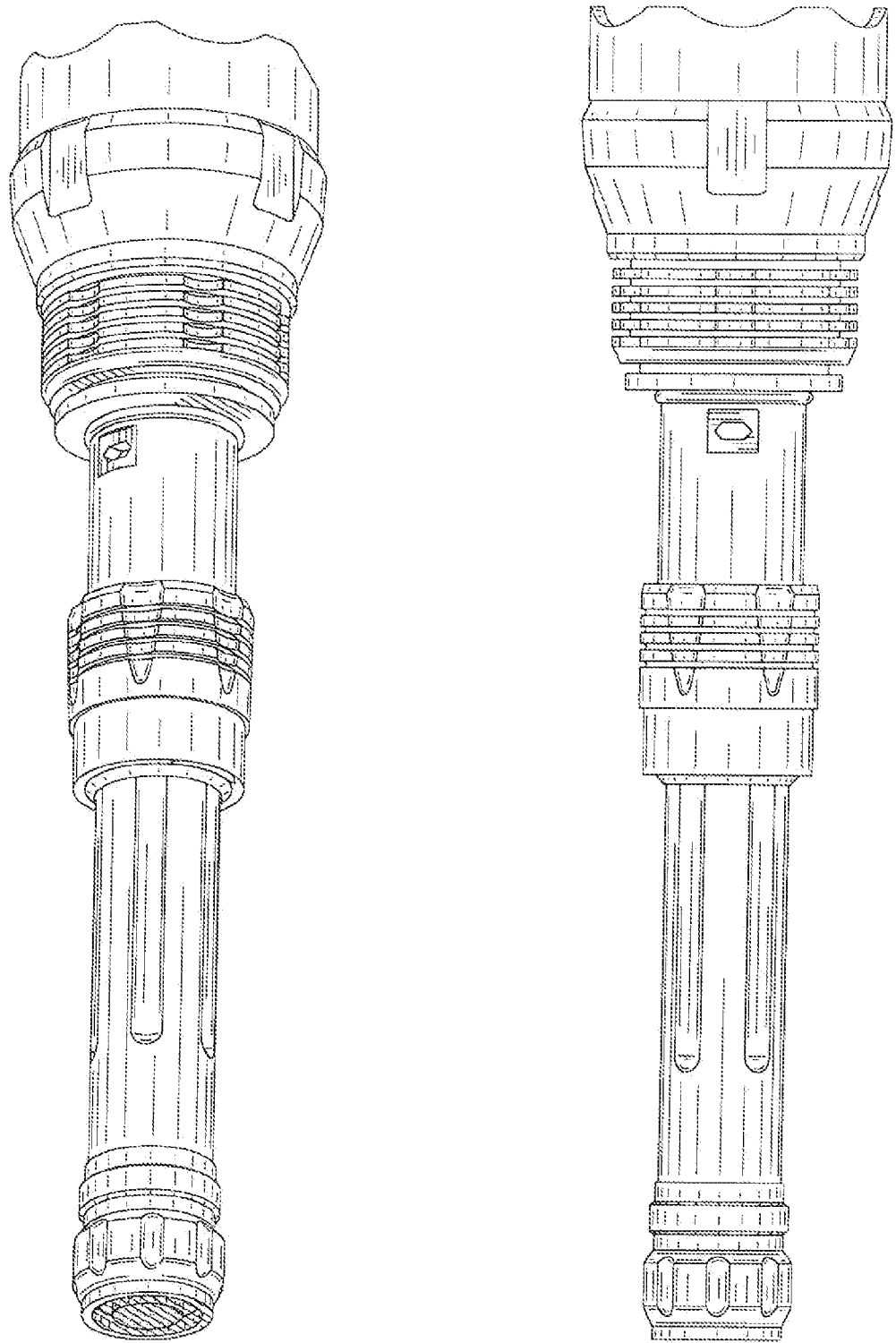
FIG. 3 shows a perspective view of the preferred embodiment with built in universal serial bus (USB).

In Section B of FIG. 1, the High Power Rechargeable Flashlight FIG. 3 is controlled when the flashlight power switch 2 sends a signal to the micro-controller 5 to tell it that the flashlight mode is active and therefore disable all other features. In this scenario, the circuitry converts the USB adapter 9 into an input device where current is drawn from an external adapter to recharge the internal battery 1 of the flashlight to power the LED light 4. The micro-controller 5 processes this information and allows the current to flow from the USB adapter port 9, to the battery charging circuit 8, the internal battery 1, the LED driver circuit and finally into the high powered led light 4. The charging circuit 8 is a switching regulator. Its primary function is to limit the current and voltage potential to the internal battery 1 received from the USB adapter port 9 typically five volt of direct current as per industry standard.

Section A describes the secondary function of the universal serial bus (USB) 9 which is to output and transfer energy from the internal battery 1 into small rechargeable electronic devices such as mobile phones, digital cameras, mp3 and similar consumer products. This mode is activated when the user selects to use the USB manual electronic switch 7. The electronic switch 7 sends a signal to the micro-controller 5 indicating to toggle to the secondary function and turn the USB adapter port 9 into a power sourcing device. Sourcing device means that the energy transfer will now flow from the internal battery 1 out to the external device 10. The way we accomplish this function is to have the micro-controller 5, send a signal to the output power supply circuit 6 to activate and transfer the energy from the internal battery 1 into the USB adapter port 9. The power supply circuit 6 is a buck regulator that lowers the higher potential voltage from the battery typically above seven volt of direct current down to five volt of direct current which is the industry standard output voltage of a USB adapter port 9. This power supply circuit 6, allows control of the maximum current deliver to the external device 10.

What is claimed is:
1. A flashlight capable of both providing light and powering an external electrical device, said flashlight comprising:
   a body member formed in a shape of a flashlight body, the body member having a first end and a second end,
   a light member disposed at the first end of the body member;
   a light circuit in communication with the light member for energizing the light member under certain conditions, the light circuit disposed within the body member;
   a bidirectional universal serial bus (USB) port accessible through the body member;

a rechargeable battery in communication with the light circuit, the rechargeable battery disposed within the body member;

a battery charging circuit in communication with the rechargeable battery and in communication with the single USB port, the battery charging circuit disposed within the body member;

a microcontroller in communication with the battery charging circuit, the microcontroller disposed within the body member; and an output power supply circuit in communication with the microcontroller and with the rechargeable battery, the output power supply circuit disposed within the body member;

wherein the microcontroller is programmed to allow energy from an external source to enter through the single electrical port and recharge the rechargeable battery in connection with the battery charging circuit and to allow energy from the rechargeable battery to exit through the single electrical port in connection with the output power supply circuit to provide power to an external electrical device.

2. The flashlight of claim 1 wherein the USB port has input and output energy transfer functionalities.

3. An electrical circuit for a first electrical device which permits for recharging of an internal power source of the first electrical device and also permits using the internal power source to power an external second electrical device both from a single electrical port associated with the first electrical device, said electrical circuit comprising:

a single electrical port;

a rechargeable battery;

a battery charging circuit in communication with the rechargeable battery and in communication with the single USB port;

a microcontroller in communication with the battery charging circuit;

an output power supply circuit in communication with the microcontroller and with the rechargeable battery;

a first electrical device switch in communication with the microcontroller; and a second electrical port switch in communication with the microcontroller;

wherein the microcontroller is programmed to allow energy from an external source to enter through the single electrical port and recharge the rechargeable battery in connection with the battery charging circuit and to allow energy from the rechargeable battery to exit through the single electrical port in connection with the output power supply circuit to provide power to an external second electrical device.

4. The flashlight of claim 1 further comprising:

a first electrical device switch in communication with the microcontroller and accessible through the body member; and a second USB switch in communication with the microcontroller and accessible through the body member.

5. The electrical circuit of claim 3 wherein the single electrical port is a universal serial bus adapter port with bidirectional capabilities with input and output energy transfer functionalities integrated into a high power rechargeable flashlight.

6. The electrical circuit of claim 3 wherein the microcontroller is programmed to allow either the recharging of the rechargeable battery or the powering of the external second electrical device at a specific instant in time and not both at the same time.

7. The electrical circuit of claim 6 wherein the single electrical port is a two-way port and acts as an input device when recharging the rechargeable battery and the acts as an output device when the rechargeable battery is providing power for the external second electrical device.

8. The electrical circuit of claim 3 wherein the microcontroller is programmed such that when a user presses the first electrical device switch the rechargeable battery is permitted to provide power for the first electrical device.

9. The electrical circuit of claim 8 wherein the microcontroller is programmed such that when a user presses the first electrical device switch the battery charging circuit and the output power supply circuit are disabled.

10. The electrical circuit of claim 3 wherein the battery charging circuit is a switching regulator.

11. The electrical circuit of claim 3 wherein the external electrical device is adapted for electrical or mechanical coupling to the single electrical port directly or through a cord.

12. The electrical circuit of claim 3 wherein the first electrical device is a flashlight.

13. The electrical circuit of claim 3 wherein the single electrical port is a bidirectional universal serial bus port.

14. The electrical circuit of claim 3 wherein the single electrical port is a USB A port, a MINI-A port, a MINI-B port, a MICRO-AB port or a MICRO-B port.

15. The electrical circuit of claim 3 wherein the output power supply circuit is a buck regulator.

16. A method for recharging a rechargeable battery of an electrical device and for using the rechargeable battery to power an external electrical device through a single bidirectional universal serial bus (USB) port accessible through the electrical device, said electrical device including a rechargeable battery, a battery charging circuit in communication with the rechargeable battery and in communication with the single bidirectional USB port, a microcontroller in communication with the battery charging circuit, an output power supply circuit in communication with the microcontroller and with the rechargeable battery, and a switch in communication with the microcontroller; said method comprising the steps of:

a. pressing the switch which causes a signal to be sent to the microcontroller;

b. either activating the battery charging circuit by the microcontroller to charge the rechargeable battery or activating the output power supply circuit by the microcontroller to power or charge an external electrical device by the rechargeable battery; and c. inputting energy through the USB port to the battery charging circuit to charge the rechargeable battery when the microcontroller activates the battery charging circuit and outputting energy from the rechargeable battery through the USB port by the output power supply circuit to power or charge an external electrical device when the microcontroller activates the output power supply circuit.

17. The method of claim 16 further comprising the step of electrically connecting an external power source to the USB port prior to activating the battery charging circuit in step b.

18. The method of claim 16 further comprising the step of electrically connecting an external electrical device to the USB port prior to activating the output power supply circuit in step b.

* * * * *